United States Patent
Fan et al.

(10) Patent No.: US 8,295,398 B2
(45) Date of Patent: Oct. 23, 2012

(54) DATA RE-TRANSFERRING METHOD BASED ON BIT TRANSFORMATION

(75) Inventors: Tao Fan, Guangdong (CN); Hao Hu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2470 days.

(21) Appl. No.: 10/491,303

(22) PCT Filed: Mar. 29, 2002

(86) PCT No.: PCT/CN02/00222
§ 371 (c)(1),
(2), (4) Date: Aug. 18, 2004

(87) PCT Pub. No.: WO03/030439
PCT Pub. Date: Apr. 10, 2003

(65) Prior Publication Data
US 2005/0002464 A1     Jan. 6, 2005

(30) Foreign Application Priority Data
Sep. 30, 2001   (CN) .................................. 01 1 36044

(51) Int. Cl.
*H04L 27/36*   (2006.01)
(52) U.S. Cl. ........ 375/298; 375/261; 375/267; 375/264; 375/284; 375/295; 375/341; 375/346; 375/347
(58) Field of Classification Search .................. 375/261, 375/225, 298; 714/748
See application file for complete search history.

(56) References Cited

U.S. PATENT DOCUMENTS

| | | | | |
|---|---|---|---|---|
| 5,822,371 | A | * | 10/1998 | Goldstein et al. ............. 375/242 |
| 5,968,198 | A | | 10/1999 | Hassan et al. |
| 5,983,382 | A | | 11/1999 | Pauls |
| 6,247,150 | B1 | | 6/2001 | Niemela |
| 6,259,744 | B1 | | 7/2001 | Lee et al. |
| 2003/0081690 | A1 | * | 5/2003 | Kim et al. ...................... 375/264 |
| 2003/0120990 | A1 | * | 6/2003 | Elbwart et al. ................. 714/748 |
| 2004/0049725 | A1 | | 3/2004 | Golitschek et al. |

FOREIGN PATENT DOCUMENTS

| EP | 1168703 | | 1/2002 |
|---|---|---|---|
| EP | 1253759 | A1 | 10/2002 |

(Continued)

OTHER PUBLICATIONS

Enhanced HARQ Method with Signal Constellation Rearrangement; TSG-RAN Working Group 1 Meeting; No. 19; Feb. 27, 2001; pp. 1-11; XP002229383; Sections 1, 2, 4 *Figures 1-4*.

(Continued)

*Primary Examiner* — Dhaval Patel

(57) ABSTRACT

The present invention discloses a data re-transferring method based on bit transformation in a communication system which adopts a high order modulation and supports a re-transferring mechanism. The method includes the processes of: exchanging the location of each bit modulated to a symbol in a constellation figure used in Quadrature Amplitude Modulation (QAM) according to a selected transformation mode; mapping re-transferred data to each bit modulated to a symbol in a constellation figure of which the location has been exchanged; performing the QAM of the re-transferred data. With the method, storage amount can be decreased, balance of reliability of bits within the same data symbol after multiple re-transferring processes can be ensured, in addition, performance of the decoder and reliability of data transmission can be improved.

19 Claims, 2 Drawing Sheets

FOREIGN PATENT DOCUMENTS

WO 00/65726 A1 11/2000
WO 01/67617 A2 9/2001

OTHER PUBLICATIONS

International Search Report for PCT/CN02/00222, mailed Jul. 11, 2002.

3rd Generation Partnership Project; Technical Specification Group Radio Access Network; High Speed Downlink Packet Access; Overall UTRAN Description (Release 5); 3GPP TR 25.855 V1.0.0 (Jun. 2001); pp. 1-26.

Validity Search Report for European Patent Application No. 1447935B1, dated Aug. 17, 2012.

* cited by examiner

DATA RE-TRANSFERRING METHOD BASED ON BIT TRANSFORMATION

CROSS-REFERENCE TO RELATED APPLICATIONS

This application is a National Stage of International application No. PCT/CN02/00222, filed Mar. 29, 2002, and published in Chinese on Apr. 10, 2003 as International Application No. WO 03/030439 A1. This application claims the benefit of CN Application No. 01136044.5 filed Sep. 30, 2001. The disclosure(s) of the above applications are incorporated herein by reference.

FIELD OF THE TECHNOLOGY

The present invention relates to data re-transferring technique, and more particularly to a data re-transferring method based on bit transformation to ensure data reliability after multiple re-transferring processes that transform bit locations of the data before modulation.

BACKGROUND OF THE INVENTION

During period of data transferring process in a communicating system, errors of transmission data or failures of not receiving the transmission data usually happen from time to time, which will influence normal work of the whole system. In order to ensure normal system operation, some systems that support re-transferring function will send the same data continuously until receiving an accurate response indicating the data has been received from opposite side. In a communication system in which data are transferred through Quadrature Amplitude Modulation (QAM), the transferred data is determined by the symbols adopted in constellation figure, in other words, during the data transferring process, the data in X axis corresponding to a symbol in constellation figure is transmitted first, and then the data in Y axis corresponding to the symbol is transmitted. Nevertheless, when number of bits modulated to a symbol is greater than or equal to 4, transmission reliability of different bits in the symbol may be different from one another. Because of which, the reliability difference will enlarge after several re-transferring processes, this will further reduce reliability of the entire data, and influence normal performance of the system at the same time. Any attempts to keep reliability of the data bits unchanged after every transferring process will reduce performance of the decoder because of different bit reliability within a symbol.

In order to equipoise and improve reliability of each bit within a symbol during re-transferring process and raise decoding performance, an enhanced Hybrid Automatic Repeat reQuest (HARQ) method based on signal constellation figure arrangement has been provided. The method modifies reliability of different bits within each symbol through changing constellation figure of high order modulation during each re-transferring process, so that consistence of the reliability among different bits within each symbol during different re-transferring processes is kept, and performance of the decoder that is based on the re-transferring processes is improved.

The fundamental principle for realizing the above-mentioned HARQ method is adopting different Gray code figures in each data re-transferring process. Taking high order modulation on 16 QAM data as an example, there can be several variations of constellation figures in high order QAM. But because each symbol in 16 QAM is composed of four bits, four different and symmetric constellation figures are generally adopted as constellation transferring figures during re-transferring process to meet the requirements, in which the four constellation figures are employed periodically. FIG. 1-FIG. 4 show four selected rectangular 16 QAM constellation figures which may be used in the HARQ method, wherein, $i_1$ represents the highest bit of the symbol, $q_1$ represents the 2nd bit of the symbol, $i_2$ is the 3rd bit and $q_2$ is the lowest bit.

It can be seen from FIG. 1 that change probability of $i_1 q_1$ is smaller than that of $i_2 q_2$, which shows the reliability of $i_1 q_1$ is higher than that of $i_2 q_2$ when transferring data with the constellation figures. Similarly, FIG. 2 shows $i_2 q_2$ has a greater change probability than $i_1 q_1$, and $i_2 q_2$ has higher reliability than $i_1 q_1$ while transferring data according to the constellation figures. In this way, adopting the selected constellation figures in turn at each transferring process can ensure reliability of each bit in the data after several re-transferring processes keeping consistent essentially. Table 1 shows the numbers of constellation figures adopted in each transferring process in this method and corresponding performance analysis:

TABLE 1

Constellation Figures Used in Data Transferring and Its Performance Analysis

| Times of transferring | Number of constellation figure | Performance analysis |
| --- | --- | --- |
| The 1st transferring | FIG. 1 | Reliability of $i_1 q_1$ is greater than that of $i_2 q_2$ |
| The 2nd transferring | FIG. 2 | After changing mapping relationship between $i_1 q_1$ and $i_2 q_2$, reliability of $i_2 q_2$ is greater than that of $i_1 q_1$ |
| The 3rd transferring | FIG. 3 | Reliability of $i_1 q_1$ is greater than that of $i_2 q_2$; this transferring is inverse mapping of the 1st transferring $i_2 q_2$ |
| 4th transferring | FIG. 4 | Reliability of $i_2 q_2$ is greater than that of $i_1 q_1$; this transfer is inverse mapping of the 2nd transfer $i_1 q_1$ |
| Later transferring | FIG. 1~FIG. 4 | The four constellation figures from 1 to 4 defined above are employed periodically |

SUMMARY OF THE INVENTION

It can be seen from the above that all of the possible mapping relationships for the selected constellation figures that may be used should be stored at both sending side and receiving side in order to improve the correct of transfer and modulate data, which will tremendously increase the storage amount. As for higher order modulations, more constellation figures may be used then should be stored and therefore larger storage capacity will be required.

Accordingly, it is an object of the embodiment of the present invention to provide a data re-transferring method based on bit transformation which is capable of reducing storage amount and keeping balance of reliability of each bit within the same symbol after multiple re-transferring processes, so as to improve performance of decoder and increase reliability of data transferring process.

It can be seen from the four constellation figures adopted in HARQ retransferring method, if the data is re-transferred with two partial or entire symmetric constellation figures, reliability of $i_1$, $i_2$ or $q_1$, $q_2$ in $i_1 q_1 i_2 q_2$ within each symbol will be just opposite. Therefore, if using the same constellation figure and exchanging the locations of bits within each symbol, namely, interchanging the locations of $i_1$ and $i_2$, or those of $q_1$ and $q_2$, the effect will be the same as that of changing constellation figures. Moreover, in the method of exchanging bit locations, only one constellation figure is needed to store at sending and receiving sides, and storage requirement is perfectly small.

Therefore, the object of the embodiment of the present invention is achieved by the following technical schemes.

A data re-transferring method based on bit transformation, at least comprising the step of: exchanging the location of each bit modulated to a symbol in a constellation figure used in Quadrature Amplitude Modulation (QAM) according to selected transformation modes before implementing QAM during each data re-transferring process.

The method may further comprise:

a. presetting the transformation mode representing no bit location transformation at mode 0, modulating and transmitting data with mode 0 during the first data transferring process;

b. judging whether it is needed to re-transfer the data after completion of the first data transferring process; if not, going to step a to transfer new data; otherwise, further judging whether all of the selected transformation modes have been used, if not, selecting the next mode in turn, if so, selecting the modes in turn from mode 0 again; and c. exchanging the locations of bits within the symbol according to the selected mode, then modulating and transmitting the processed data.

In the above-mentioned method, the transformation mode represents location arrangement sequence of the bits modulated to a symbol.

In the above-mentioned method, exchanging the location of each bit is implemented in a bit transformation device which includes a serial/parallel converter, a register and a controller. The implementation of exchanging the location of each bit in a bit transformation device comprises: converting the inputted serial data to parallel data with the serial/parallel converter in the bit transformation device and sending the parallel data to the register for storing first; then, controlling output order of the locations of the bits constituting the parallel data with the controller during outputting the parallel data so as to complete bit location transformation.

When the order of QAM is $2^n$, each symbol in the QAM constellation figure is composed of n bits. The bit number n is equal to or greater than 4. The sequence of bits modulated to a symbol in the QAM constellation figure can be set at $i_1 q_1 \ldots i_m q_m$ and number of the bit transformation modes for each symbol can be set at $(m!)^2$. Here, m is n/2.

Embodiments of the present invention provide a data re-transferring method in a communication system adopting a QAM, including:

converting a group of data from serial to parallel;

processing transformation of bits constituting the converted group of data according to a selected transformation mode;

mapping the transformed bits to a constellation figure;

performing the QAM for the mapped bits.

Embodiments of the present invention also provide a data re-transferring device, including:

a serial/parallel converter, configured to convert a group of data from serial to parallel;

a register, configured to store the converted parallel data; and a bit transformation controller, configured to process transformation of bits constituting the stored data according to a selected transformation mode.

A preferred embodiment of the invention facilitates to exchange the location of each bit constituting data before implementing modulation during each data re-transferring process.

In the data re-transferring method based on bit transformation provided in the invention, the reliability of different bits within the same symbol is changed through exchanging the locations of the bits within the data before each data re-transferring process. In this way, balance of reliability of different bits within a symbol is kept after multiple transferring processes. Because only a same constellation figure is used during each re-transferring process, it is enough for the sending and receiving sides to store just one basic constellation figure mapping relationship, which can reduce the storage amount and further improve reliability of data transferring process.

DETAILED DESCRIPTION OF THE INVENTION

The present invention will be described in more detail hereinafter with reference to the accompanying drawings.

Assume the communication system adopts high order modulation and supports re-transferring mechanism, and assume the order of the high order modulation is $2^n$, which means each point (each symbol) in the constellation figure is composed of n bits, wherein each symbol can be presented with bit series $i_1 q_1 \ldots i_m q_m$ (m=n/2). Because the reliability of different bits within each symbol in high order modulation is different, in the present invention, the object of balancing reliability of each bit is achieved via multiple re-transferring processes, in each of which reliability of the corresponding bits is changed through adjusting bit locations. A specific operation for bit transformation is exchanging $i_1, i_2, \ldots, i_m$ or $q_1, q_2, \ldots, q_m$. Generally, there are $(m!)^2$ combinations for location exchanging, each of which corresponds to one number, for instance, the number for the mode of no data bit transformation is zero, and other modes are numbered in series. It is enough to select only one of the exchanging modes to implement location transform for the data bits to be transferred. Taking data transferring process with 16 QAM high order modulation as an example, the order number of the high order modulation is $2^4$, namely, n is 4, each point (each symbol) in the constellation figure is composed of 4 bits, wherein each symbol can be expressed with bit series $i_1 q_1 i_2 q_2$.

As for 16 QAM high order modulation, there are four bit-transforming modes within each symbol, which are $i_1 q_1 i_2 q_2$, $i_2 q_1 i_1 q_2$, $i_1 q_2 i_2 q_1$, $i_2 q_2 i_1 q_1$ respectively. Among which $i_1q_1i_2q_2$ is appointed as original state without bit transformation, the number is correspondingly signed as 0, other modes are numbered in series as mode1, mode2 and mode3.

Figure 1:
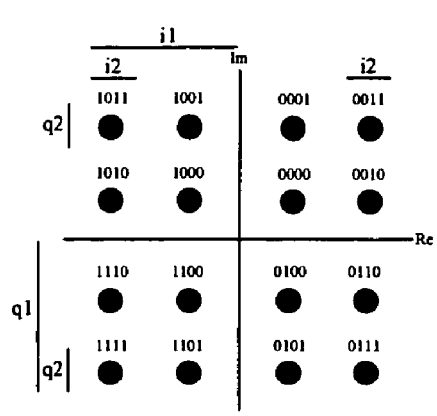
FIG. 1 is a constellation figure illustrating the first 16 QAM constellation used in data re-transferring operation with HARQ method.
Figure 2:
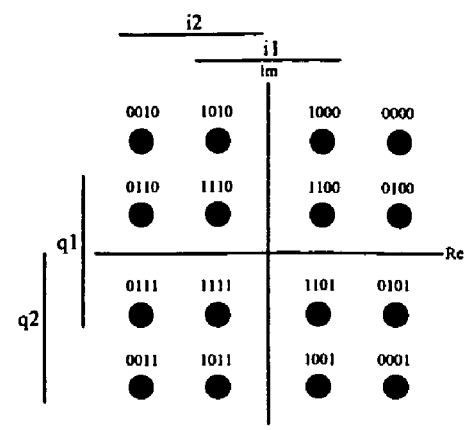
FIG. 2 is a constellation figure illustrating the second 16 QAM constellation used in data re-transferring operation with HARQ method.
Figure 3:
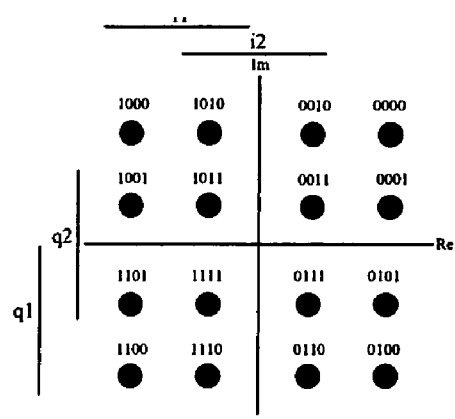
FIG. 3 is a constellation figure illustrating the third 16 QAM constellation used in data re-transferring operation with HARQ method.
Figure 4:
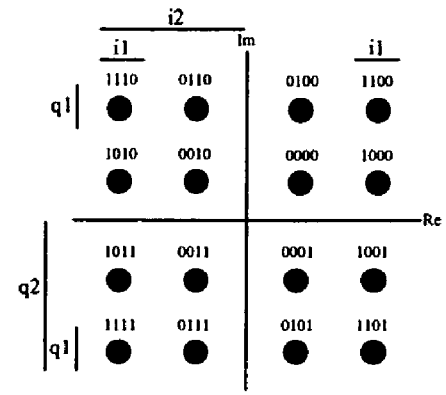
FIG. 4 is a constellation figure illustrating the fourth 16 QAM constellation used in data re-transferring operation with HARQ method.
Figure 5:
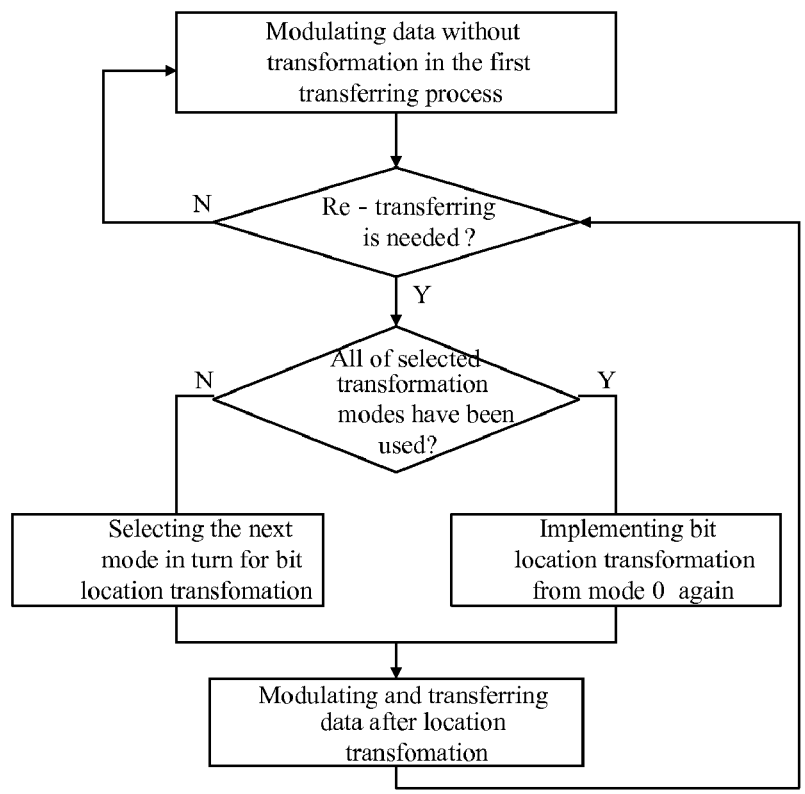
FIG. 5 is a flow chart of data re-transferring process according to the present invention.

As shown in FIG. 5, while transferring and re-transferring data with the method according to the present invention, the operation process at sending side at least comprises the following steps.

1) At first transferring process, no transformation is implemented for data bits, which means the data bits are modulated and transmitted under mapping relationship in the constellation figure according to bit transformation mode 0.

2) After the completion of data transmission, the system will judge whether it is needed to re-transfer the data, if the last data transmission succeeds, then go back to step 1) to transfer new data, otherwise go to step 3) for data retransferring.

3) If data retransferring is needed, the system judges whether all of the four selected transferring modes have been employed, if no, then the system selects a mode in turns next to the used one; if so, then restarts from mode 0. After having selected the bit transformation mode, the system will transform the data bits according to the selected mode, and then, modulate and transmit the data based on the mapping relationship in the constellation figure, and at last return to step 2).

In step 3), two methods can be adopted when transforming the data bits to be transmitted according to the selected bit transformation mode, which are hardware mode and software mode.

Figure 6:
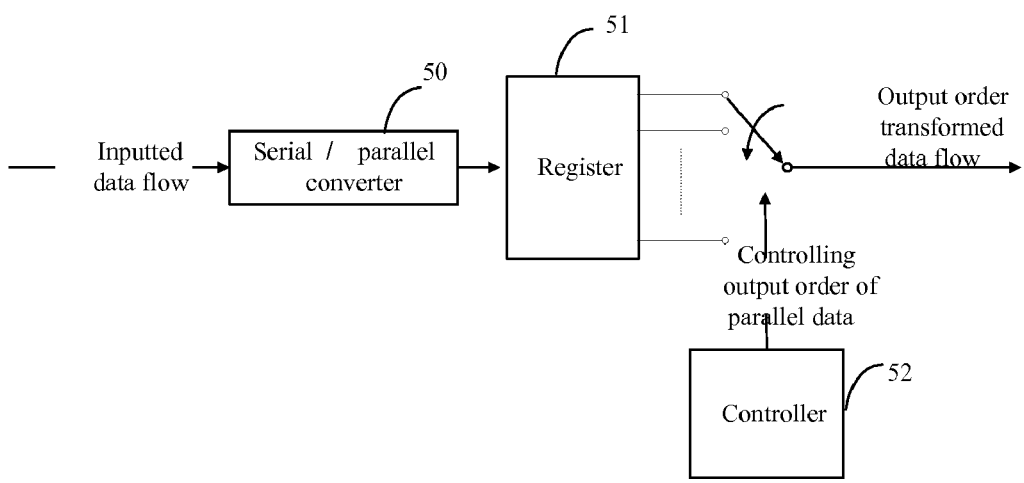
FIG. 6 illustrates an embodiment according to the present invention.

When implementing bit transform with hardware mode, as shown in FIG. 6, the bit transformation device at least comprises a serial/parallel converter 50, a register 51 and a controller 52. The controller 52 is used for controlling output order of the bits so as to implement exchanging for the bit locations. At sending side, the serial/parallel converter 50 converts the inputted serial data flow to parallel data, and transmits the data to the register 51 for storing. Then, the controller 52 controls output order of the bit locations of the parallel data so as to exchange locations of the data bits, then modulates and transmits the data flow after transformation at last. Similarly, there are also equipped a bit transformation device at the receiving side. After modulating the received data, the system recovers original order of the data bits through inverse transformation made by the bit transformation device, and implements the following processes. Selected bit transformation modes and the selecting order for them are preset in the controller 52.

The bit transformation can also be implemented by means of software programming. In this mode, data locations are stored by means of array or queue, and rearranged according to the predetermined transforming modes. The transformed data are modulated and outputted. When compared with hardware device, the speed of process with the software mode is slower.

In the present invention, the locations of data bits are transformed before high order modulation, rather than rearranging directly on the constellation figures. Therefore, only one constellation figure is enough for the method, which can reduce storage requirements while transmitting data, and keep reliability of each bit within the same data symbol consistent after multiple re-transferring operations.

According to the present invention, when selecting combination modes of data bit location transform, not only some random modes can be selected, but also all the $(m!)^2$ modes can be selected.

In a word, the foregoing discussion discloses and describes merely preferred embodiment of the present invention, and is not to be construed as limiting the present invention.

The invention claimed is:

1. A data re-transferring method based on bit transformation in a communication system, wherein the communication system adopts a high order modulation and supports a re-transferring mechanism, the method comprising:

exchanging the location of each bit modulated to a symbol in a constellation figure used in Quadrature Amplitude Modulation (QAM) according to a selected transformation mode;

mapping re-transferred data to each bit modulated to a symbol in a constellation figure of which the location has been exchanged; and performing the QAM of the re-transferred data.

2. The method of claim 1, further comprising:

presetting the transformation mode representing no bit location transformation at mode 0, modulating and transmitting data with the mode 0 during the first data transferring process;

judging whether it is needed to re-transfer the data after completion of the first data transferring process; if not, going to step of modulating and transmitting new data with the mode 0; otherwise, further judging whether all of the selected transformation modes have been used, if not, selecting the next mode in turn, if so, selecting the modes in turn from mode 0 again; and exchanging the locations of bits modulated to a symbol according to the selected mode, then modulating and transmitting the processed data.

3. The method according to claim 1, wherein said transformation mode represents location arrangement sequence of the bits modulated to a symbol.

4. The method according to claim 1, wherein exchanging the location of each bit is implemented by a bit transformation device.

5. The method according to claim 4, wherein the implementation of exchanging the location of each bit by a bit transformation device comprises:

converting the serial input to parallel output by a serial/parallel converter in the bit transformation device and sending the parallel output to a register for storing first; then, controlling output order of the bits constituting the parallel output by a controller during outputting the parallel data so as to complete bit location transformation.

6. The method according to claim 1, wherein when the order of QAM is $2^n$, each symbol in the QAM constellation figure is composed of n bits.

7. The method according to claim 6, wherein said bit number n is 4, 6 or 8.

8. The method according to claim 6, wherein the sequence of bits modulated to a symbol in the QAM constellation figure is set at $i_1q_1 \ldots i_mq_m$ in which m is n/2.

9. The method according to claim 6, wherein number of the bit transformation modes for each symbol is $(m!)^2$ in which m is n/2.

10. A data re-transferring method in a communication system adopting a Quadrature Amplitude Modulation (QAM), comprising:

converting a group of data from serial to parallel;

processing transformation of bits constituting the converted group of data according to a selected transformation mode;

mapping the transformed bits to a constellation figure;

performing the QAM for the mapped bits.

11. The method of claim 10, further comprising:
modulating the group of data with no bit transformation;
transmitting the group of data with a transformation mode representing no bit transformation at mode 0 during the first data transferring process;
judging whether it is needed to re-transfer the group of data after the first data transferring process;
if it is not needed to re-transfer the group of data, processing said modulating step and transmitting a new group of data with the mode 0;
if it is needed to re-transfer the group of data, using a next selected transformation mode in turn, when each of the transformation mode has been used for the same times during transferring of the same group of data, selecting a transformation mode in turn from mode 0 again; and
processing transformation of bits modulated to a symbol according to the selected transformation mode, modulating and transmitting the processed group of data, and processing the judging step.

12. The method according to claim 10, wherein said processing transformation of bits at least comprises bit swapping, and the bit swapping refers to arrange location sequence of the bits modulated to a symbol.

13. The method according to claim 12, wherein the bit swapping is implemented by a bit transformation device.

14. The method according to claim 13, wherein the implementation of the bit swapping by a bit transformation device comprises:
converting the serial input to parallel output by a serial/parallel converter in the bit transformation device and sending the parallel output to a register for storing first; then, controlling output order of the bits constituting the parallel output by a controller during outputting the parallel data so as to complete the bit swapping.

15. The method according to claim 12, wherein said processing transformation of bits further comprises bit inversion.

16. The method according to claim 12, wherein when the order of QAM is $2^n$, each symbol in the QAM constellation figure is composed of n bits.

17. The method according to claim 16, wherein said bit number n is 4, 6 or 8.

18. The method according to claim 16, wherein the sequence of bits modulated to a symbol in the QAM constellation figure is set at $i_1 q_1 \ldots i_m q_m$ in which m is n/2.

19. The method according to claim 16, wherein number of the transformation modes for bits modulated to each symbol is $(m!)^2$ in which m is n/2.

* * * * *